No. 874,740. PATENTED DEC. 24, 1907.
W. E. DALBY.
LUBRICATING AXLE.
APPLICATION FILED JUNE 12, 1907.
2 SHEETS—SHEET 1.
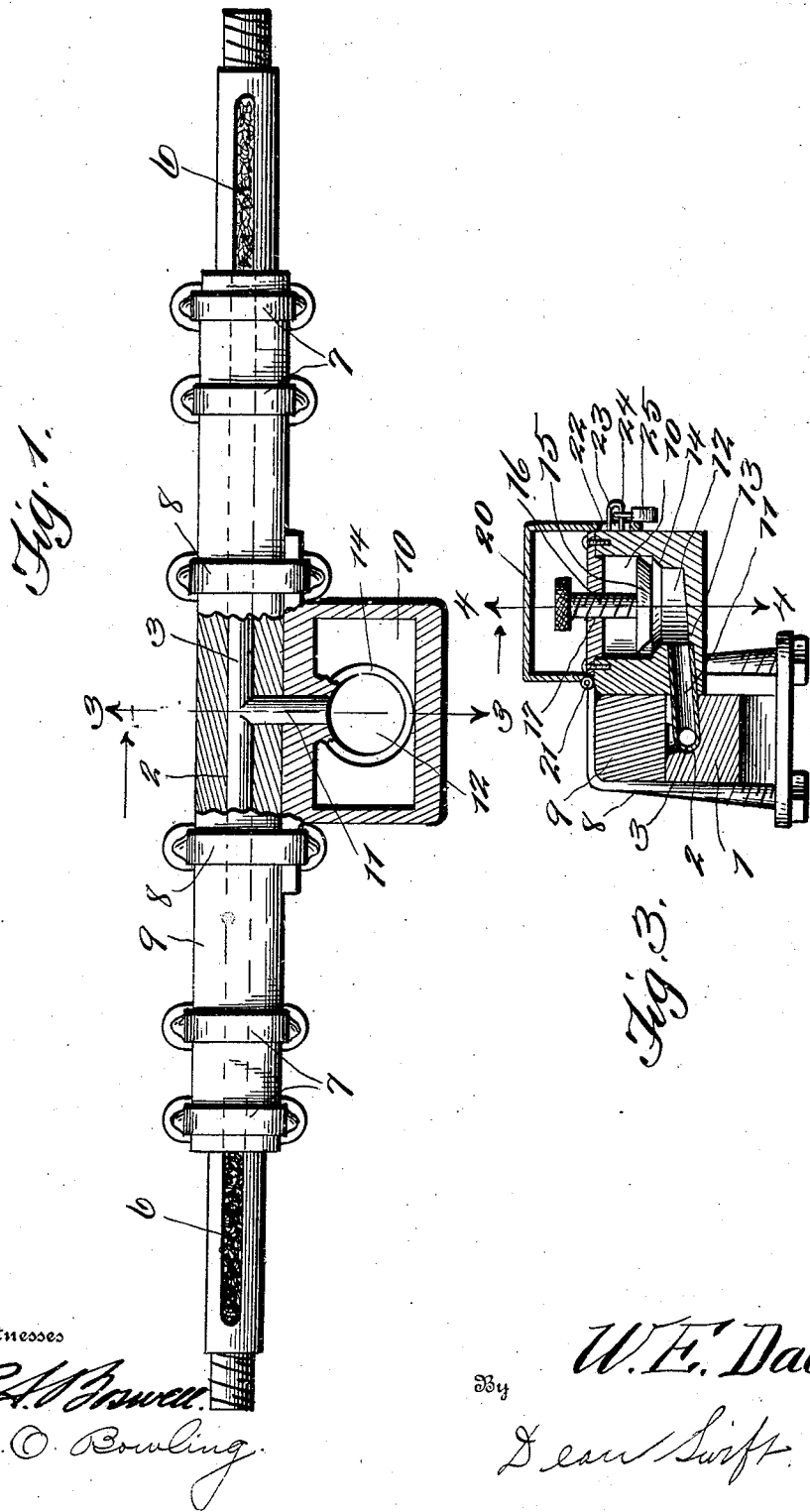
Witnesses
Inventor
W. E. Dalby
By Dean Swift
Attorney

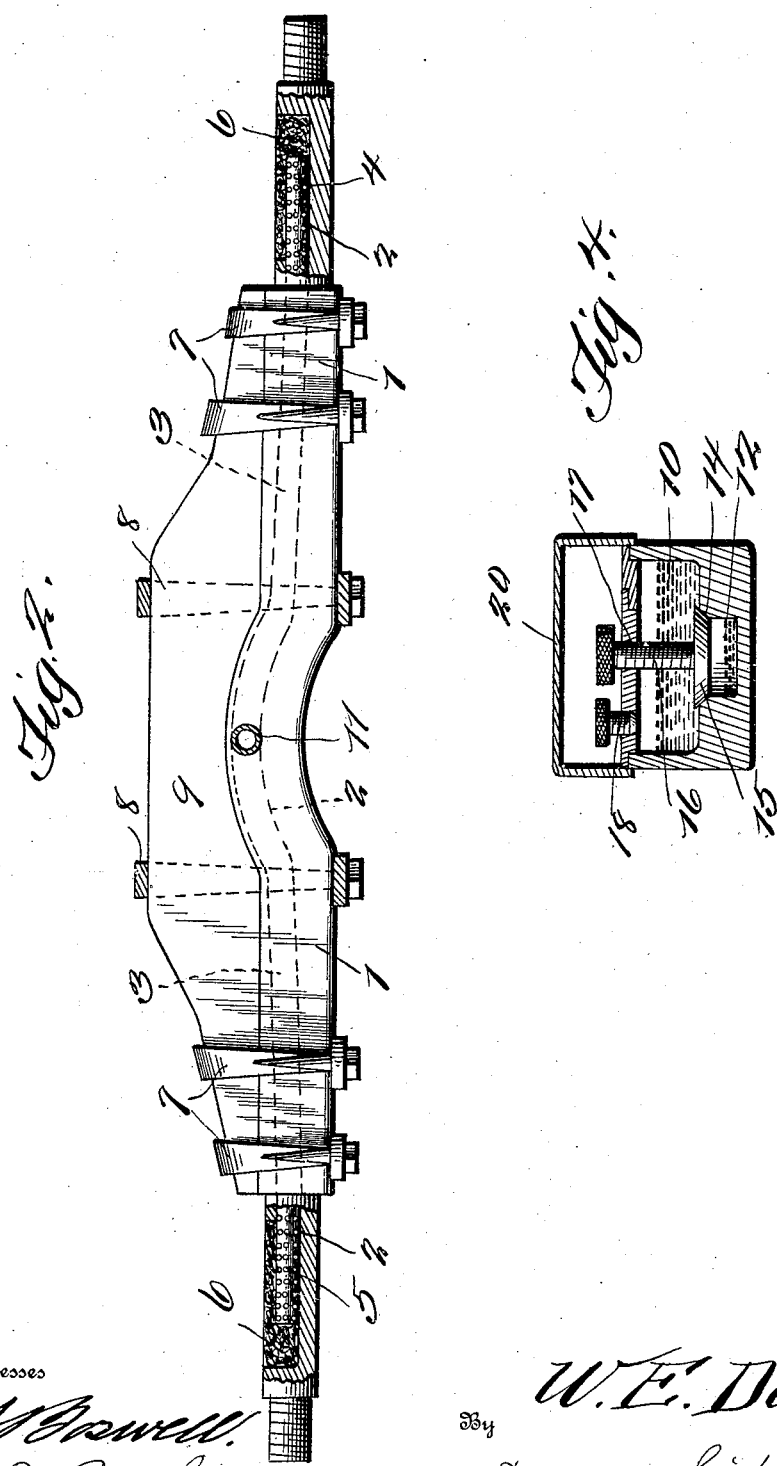

UNITED STATES PATENT OFFICE.

WILLIAM E. DALBY, OF HESTER, NORTH CAROLINA.

LUBRICATING-AXLE.

No. 874,740.  Specification of Letters Patent.  Patented Dec. 24, 1907.

Application filed June 12, 1907. Serial No. 378,638.

*To all whom it may concern:*

Be it known that I, WILLIAM E. DALBY, a citizen of the United States, residing at Hester, in the county of Granville and State of North Carolina, have invented a certain new and useful Lubricating-Axle, of which the following is a specification, reference being had therein to the accompanying drawing.

This invention pertains to a new and useful lubricator, adapted for axles of any description, and it has for its object to provide a reservoir from which extends tubular members which extend to and into the spindle, around which the journal of the wheels rotates, as shown clearly in Figure 1. The ends of these tubular member are perforated to allow the lubricant material to find its way to the felt pads carried in chambers of said spindles. Furthermore, the reservoir is provided with a well, into which, the lubricant is allowed to run, when the valve carried by the reservoir is open.

With these and other objects in view, the invention comprises further combinations of features, which will be hereinafter described, shown in the drawings, and specifically defined by the appended claims.

In the drawings, Fig. 1 is a top plan view of the device, showing the reservoir in section. Fig. 2 is an elevation of the device partly in section. Fig. 3 is a sectional view on line 3—3 of Fig. 1, and Fig. 4 is a sectional view on line 4—4 of Fig. 3.

Referring specifically to the drawings, 1 designates an axle, which is provided with a longitudinal recess 2, which extends from spindle to spindle. This recess receives a tubular duct 3, the ends of which are perforated as at 4 and 5 for the purpose of allowing the lubricant to escape to be absorbed by the felt 6, fixed in that part of the recess which extends into the spindles of the axle.

The center of the axle is slightly bowed and fixed to the axle by the clips 7 and 8 is a bolster 9, which prevents displacement of the tubular duct.

Fixed to the axle and bolster by means of one pair of the said clips, is a lubricant reservoir 10, which has connection with the tubular duct 3 by means of the duct 11, as shown clearly in Fig. 3. This duct 11 enters through the wall of the well 12, formed in the bottom of the reservoir. This well has its bottom inclined slightly, as at 13, to allow the lubricant to enter the duct 11. This well is also provided with a valve seat 14, which is designed to be closed by the valve 15, having a shank 16, which is threaded in an aperture 17, in the upper portion of the reservoir, which portion is riveted in the proper position to form a closure thereto. In the upper portion of the reservoir in which the shank 16 is threaded, an aperture is provided, in which a plug 18 is threaded which may be removed when desired to refill the reservoir. A second closure 20, for the reservoir, is provided, which is hinged as at 21, as shown clearly in Fig. 3. This second closure is rectangular in contour and its free end is provided with a clasp 22, having a slot 23 through which a staple 24 is designed to enter, that is, when the said closure is in the position shown in Fig. 3. After the staple 24 enters the slot, a suitable pad-lock 25 is connected to said staple to prevent displacement of the clasp.

From the foregoing, it will be plainly observed that a simple and efficient device is provided, whereby the spindles of axles may be easily lubricated, as clearly shown in the drawings.

Having thus described the invention, what is claimed as new and useful, is

1. In a lubricant device, an axle, a bolster carried thereby, a T-shaped duct fixed therebetween and a valve-controlled reservoir communicating with said duct.

2. In a lubricant device, an axle, a bolster carried thereby, a T-shaped tubular duct fixed therebetween, and a valve-controlled reservoir communicating with said duct, and a double closure for the said reservoir.

3. In a lubricant device, an axle having a longitudinal recess, a bolster carried thereby, a T-shaped tubular duct, having its ends perforated, seated in said recess and between the axle and bolster, a reservoir communicating with said duct, said reservoir having a valve-controlled well, and a double closure for the said reservoir.

4. In a lubricant device, an axle having a longitudinal recess, a bolster carried thereby, a T-shaped tubular duct having its ends perforated seated in said recess, a reservoir communicating with said duct, said reservoir having a well, a valve having a screw-threaded shank for closing said well, a pair of closures for the reservoir, one of which, is provided with a threaded aperture to receive said shank, while the other is hinged to the outer portion of the reservoir, and a lock for one of said closures.

In testimony whereof I hereunto affix my signature in presence of two witnesses.

WILLIAM E. DALBY.

Witnesses:
    A. B. Moss,
    J. T. Aiken.